(12) United States Patent
Craine (10) Patent No.: US 8,228,203 B2
(45) Date of Patent: *Jul. 24, 2012

(54) INTERACTION ANALYZER (75) Inventor: Ari Craine, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/621,168

(22) Filed: Nov. 18, 2009

(65) Prior Publication Data

US 2010/0066541 A1    Mar. 18, 2010

Related U.S. Application Data

(63) Continuation of application No. 11/820,158, filed on Jun. 18, 2007, now Pat. No. 7,642,920.

(51) Int. Cl.
G08B 23/00 (2006.01)
G08B 5/22 (2006.01)
G06F 17/00 (2006.01)

(52) U.S. Cl. ............. 340/573.1; 340/539.1; 340/539.13; 340/539.16; 340/825.49; 235/375; 235/385

(58) Field of Classification Search ............. 340/539.13, 340/572.1, 573.1, 825.49; 235/375, 385
See application file for complete search history.

(56) References Cited

U.S. PATENT DOCUMENTS

| | | | |
|---|---|---|---|
| 4,654,793 A | 3/1987 | Elrod | |
| 5,774,876 A * | 6/1998 | Woolley et al. | 705/28 |
| 5,936,542 A | 8/1999 | Kleinrock et al. | |
| 6,674,368 B2 | 1/2004 | Hawkins et al. | |
| 7,015,816 B2 | 3/2006 | Wildman et al. | |
| 7,272,490 B2 * | 9/2007 | Imasaki et al. | 701/200 |
| 7,386,276 B2 | 6/2008 | Sama et al. | |
| 7,420,464 B2 * | 9/2008 | Fitzgerald et al. | 340/539.13 |
| 7,475,813 B2 * | 1/2009 | Swanson, Sr. | 235/383 |
| 7,541,926 B2 | 6/2009 | Dugan et al. | |
| 2006/0111961 A1 * | 5/2006 | McQuivey | 705/10 |
| 2006/0180647 A1 | 8/2006 | Hansen | |

* cited by examiner

*Primary Examiner* — Shirley Lu (74) *Attorney, Agent, or Firm* — Myers Bigel Sibley & Sajovec (57) ABSTRACT

A method of analyzing participant activity includes providing an identification unit to a participant, receiving signals from the identification unit, determining location of the participant based on the received signals, storing the location information and the associated timestamp and analyzing the stored information.

18 Claims, 4 Drawing Sheets

FIG. 6     <u>320</u>

INTERACTION ANALYZER

CROSS-REFERENCE TO RELATED APPLICATION

This application is a continuation of U.S. application Ser. No. 11/820,158, filed Jun. 18, 2007 now U.S. Pat. No. 7,642,920, the disclosure of which is hereby incorporated herein by reference in its entirety as if set forth fully herein.

BACKGROUND

This invention relates generally to data analysis and more particularly to methods and apparatus for analyzing activity based on tracking movement of individuals.

Data analysis can be used to assist in optimizing marketing efforts. Data analysis of spending habits (such as shopping, travelling, dining, etc.) enable purveyors of these services to more accurately and precisely identify and communicate with their target (i.e. likely) consumers.

Currently, there does not exist an automated method for analyzing interaction between individuals in certain environments such as at a conference. The effectiveness or success of a conference is typically determined based on attendance.

Participants may attend educational sessions or they may conduct these sessions. Participants may also be vendors who set up booths to promote their products/services. Participants may only have contact information from other participants in the form of business cards evidencing any interaction. This information may be used for evaluating the effectiveness of conference attendance. However, this approach is cumbersome since contact information has to be exchanged manually and perhaps scanned in for later retrieval and analysis. There exists a need for more accurately analyzing interaction between participants in a particular environment such as at a conference.

SUMMARY

According to exemplary embodiments, a method of analyzing participant activity comprises providing an identification unit to a participant, receiving signals from the identification unit, determining location of the participant based on the received signals, storing the location information and the associated timestamp and analyzing the stored information.

According to further exemplary embodiments, a monitoring system for analyzing participant activity comprises a receiver for receiving signals from a plurality of participants and a computer for associating the received signals to corresponding participants, determining a location of the participants based on the received signals, determining a level of interaction between at least two participants and storing the location and interaction information.

In further embodiments, a computer-readable medium contains a computer program for analyzing participant activity. The computer program, when executed on a computing device, causes the computing device to assign an identification unit to a participant, receive signals from the identification unit, determine location of the participant based on the received signals, store the location information and analyze the stored information.

BRIEF DESCRIPTION OF THE DRAWINGS

The various features, advantages, and objects of the invention will be understood by reading this description in conjunction with the drawings, in which.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

In general, exemplary embodiments describe tracking movement of participants at a gathering such as at a conference for example. Specifically, a participant's physical location as well as his or her location with respect to other participants may be monitored utilizing tracking devices or modules. The devices may be on the person of the participants.

Figure 1:
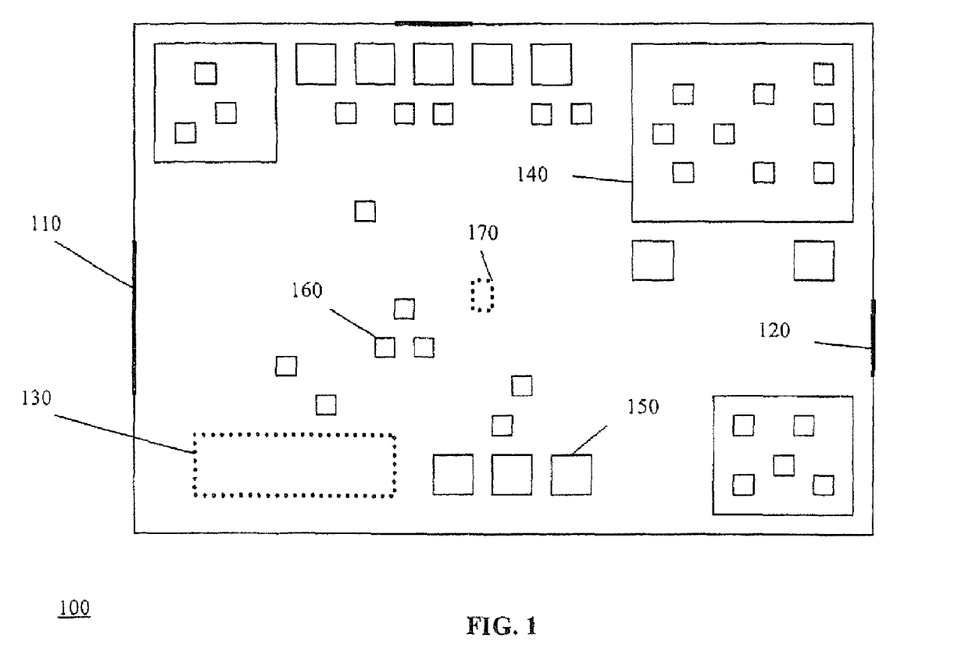
FIG. 1 illustrates an exemplary conference facility.

FIG. 1 illustrates an environment such as, but not limited to, a conference facility 100 for implementing exemplary embodiments. Exemplary embodiments as described herein may be implemented in shopping centers, malls, nursing homes, hospitals, child care/day care centers, prisons, farms and grocery stores. The conference facility 100 may be located within a hotel or a convention center for example. Access to the conference facility 100 may be provided via a main entrance 110 as well as other entrances 120. Conference facility 100 may include a registration section 130 where participants may register to attend a conference and/or events occurring at the conference facility 100. Conference facility 100 may include a plurality of rooms 140 for conducting educational sessions, etc. A plurality of booths 150 may also be included within conference facility 100. Booths 150 may be occupied by vendors to promote, demonstrate or provide information on their products for example.

Figure 2:
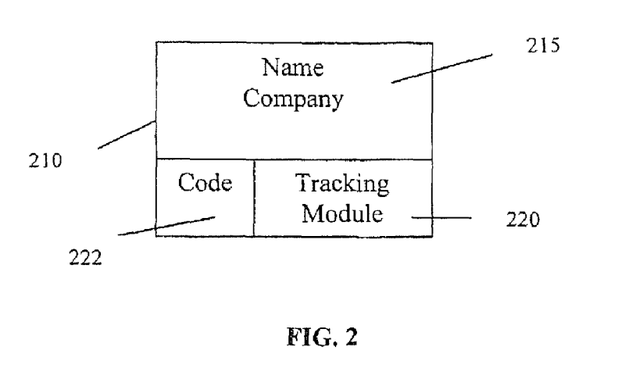
FIG. 2 illustrates an exemplary identification unit worn by participants.

As illustrated in FIG. 2, a tracking module 220 may be integrated into identification units associated with participants 160 attending conferences and/or events at the conference facility 100. Also shown in FIG. 2 and discussed below, the identification unit may include a badge 210 worn by the participants 160 attending a conference and/or event at the conference facility 100. The tracking modules 220 may emit signals that can be detected within a predetermined range. The range may depend on the type of tracking module 220 that is in use.

The tracking module 220 may transmit a signal in one of many forms. The signal could be an electronic signal such as a radio frequency signal. One example of the tracking module 220 using a radio frequency signal may be a radio frequency identification (RFID) module. A cellular telephone may function as the tracking module 220 as well.

The signal transmitted by the tracking module 220 may include a sonic signal, an optical signal, or any other forms of wireless signal. Any one of the types of tracking modules 220 used herein may transmit a wireless signal and operate autonomously. Each of these types of tracking modules 220 may require different amounts of power for transmission of the signal. The range of the signal may depend on the amount of power used for transmission.

Each of the participants 160 may be wearing an identification unit, such as the badge 210 as illustrated in FIG. 2. Badge 210 may include information 215 about the participant 160 such as the name of the participant, the name of an employer/company of the participant, etc. Badge 210 may also include, or have integrated within, the tracking module 220.

A central monitoring station 170 may also be located within conference facility 100. Central monitoring station (CMS) 170 may detect or receive signals from the tracking modules 220 located within accessible/detectable range of the CMS 170. In order to optimize the reception of signals from the tracking modules 220, central monitoring station 170 may be located near the center of conference facility 100.

Figure 3:
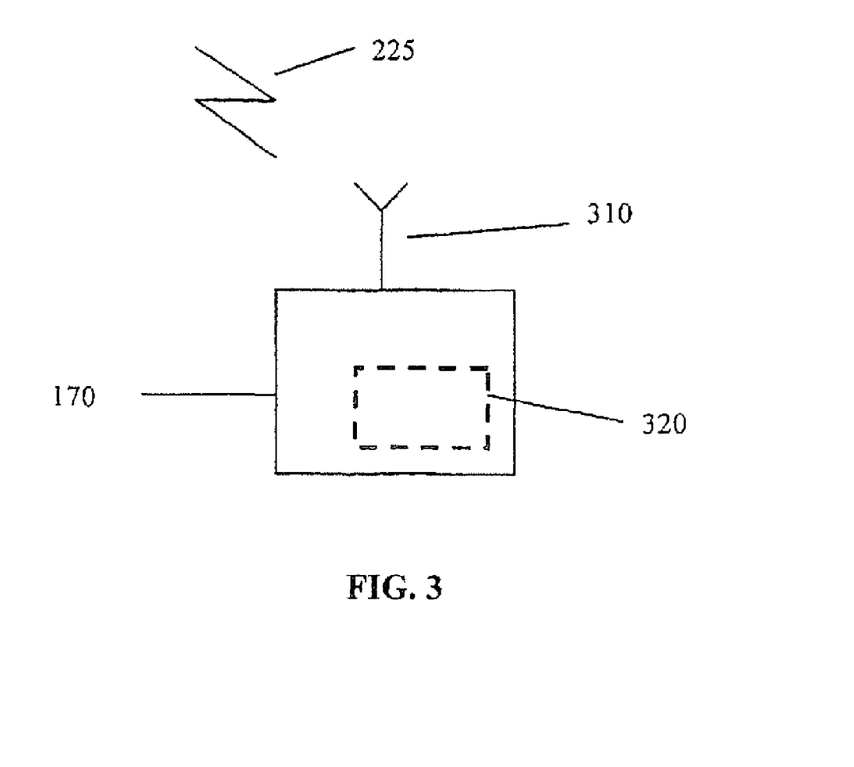
FIG. 3 illustrates an exemplary central monitoring station.

FIG. 3 illustrates an exemplary embodiment of the central monitoring station 170. Central monitoring station 170 may include a receiving component such as an antenna 310. Antenna 310 may receive signals 225 emitted from tracking modules 220.

Central monitoring station 170 may also include a computing device 320 for processing received signals 225 and for determining a location of the participant 160 based on the signal 225 from the tracking module of the badge 210 associated with the particular participant 160. Some tracking modules 220 may provide their geographic location in the transmitted signal 225. Participant location may also be determined from the transmitted signal by triangulation for example. An indoor localization system that is economical and may be utilized is the LANDMARC system.

In addition to determining the location of the participant 160, exemplary embodiments may also determine interaction between participants 160 and between the participant 160 and one or more of the booths 150. Signals 225 from tracking modules 220 may be utilized to determine the location of participants 160 wearing the badges 210 including the tracking modules 220.

If the participant 160 remains at the booth 150 for a predetermined amount of time, then a determination may be made that participant 160 has shown some interest in products or services offered by a vendor corresponding to booth 150. Presence at the booth 150 may be determined by comparing the participant's location with locations corresponding to the plurality of booths 150.

Similarly, if two participants 160 are determined to have been located at the same location or within close proximity of each other for a predetermined amount of time, then a determination may be made that these two participants have interacted with each other. The length of the predetermined amount of time may also represent the extent of interaction between the participants 160.

A timestamp may be associated with a location of the participant 160. That is, as the tracking module 220 of the participant 160 emits signals 225, the central monitoring station 170 may also record a time at which the signal is received. In this manner, the location of the participant 160 at a particular time may be chronicled/recorded.

Figure 4:
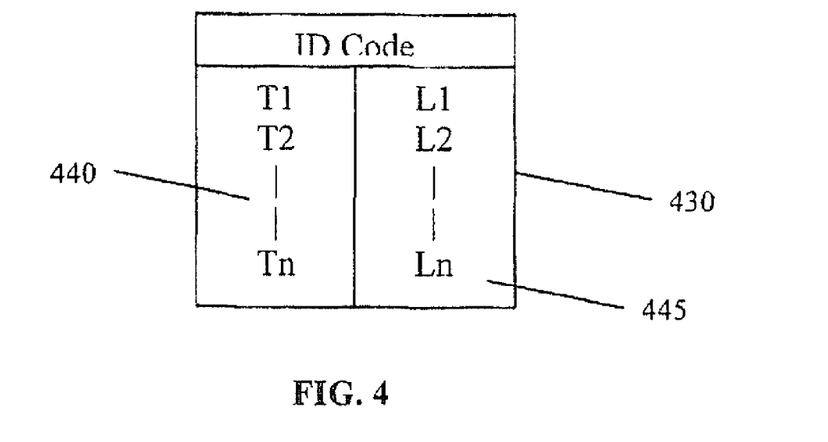
FIG. 4 illustrates an exemplary record generated from location information according to exemplary embodiments.

A record 430 for each of the participants 160 may be maintained within computing device 320. As illustrated in FIG. 4, record 430 may include the identity of participant 160, the location information associated with the participant, and the time information associated with the location information for example. Record 430 may include columns 440 and 445 where column 440 may include a timestamp and column 445 may include a location corresponding to the timestamp.

In some embodiments, badge 210 may also include a code 222. Code 222 may be an identification assigned to participant 160 wearing badge 210. Code 222 may not include any personal information that can be used to identify the particular participant 160. Code 222 thus may be used to anonymously analyze data collected about location and time (spent at a particular location) of participant 160 at a conference. Participant 160 may be provided with his or her personal code 222, but central monitoring station 170 may not be provided with the identity of participant 160 corresponding to personal code 222.

The participant 160, after the conference or at the end of a day at the conference, may request or collect information about his or her location at the conference (such as places visited at the conference). The information collected may indicate for example, how long the participant 160 spent at the booth 150 of a particular vendor. Based on this information, the participant 160 may decide whether to release his or her information to a particular vendor. The information collected (anonymously) by the conference may also be used for analytic purposes as described further below. A first participant may also obtain information about other participants that interacted with the first participant during the conference or event.

As noted above, the tracking module 220 may include a RFID module. The RFID module may include an active RFID module or a passive RFID module. The active RFID module may transmit a signal at a predetermined interval such as at every two minutes for example.

The passive RFID module may respond to a signal from the central monitoring station 170. That is, the central monitoring station 170 may poll the passive RFID module at a predetermined frequency. The central monitoring station 170 may poll the passive RFID module periodically, such as every two minutes, or at any other amounts of time based on a number of factors such as, for example, the number of participants, etc. The operation of RFID modules is well known and will not be described in further detail.

Figure 5:
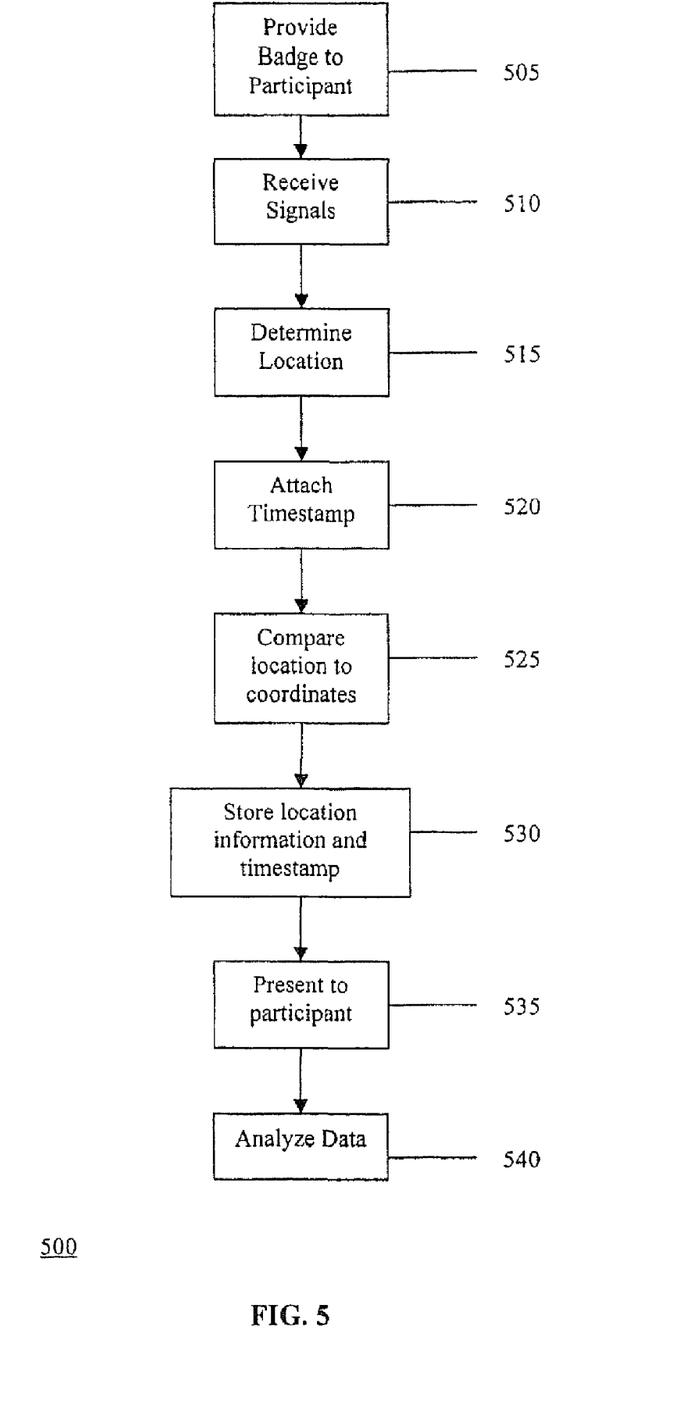
FIG. 5 illustrates an exemplary method for monitoring location of a participant.

An exemplary method 500 may be described with reference to the flow diagram of FIG. 5. The badge 210 including tracking module 220 may be provided to a participant, such as the participant 160, when the participant arrives at the conference facility 100 at 505. The participant 160 may be attending a conference, convention, etc. at the facility 100. The badge 210 may be worn by the participant 160 or associated with the participant in some other manner.

Central monitoring station (CMS) 170 may commence monitoring the location of participant 160 at 510. As described, monitoring may be performed by receiving signals 225 from tracking module 220 associated with the badge 210 at a predetermined frequency.

The received signals 225 may be utilized to identify the participant 160 associated with the tracking module 220 emitting the signal and determine a location (in terms of coordinates for example) of the participant at 515. A timestamp may be associated with the monitored location at 520. The time may be accessible to CMS 170 and may be dependent on an atomic clock to ensure accuracy for example.

Figure 6:
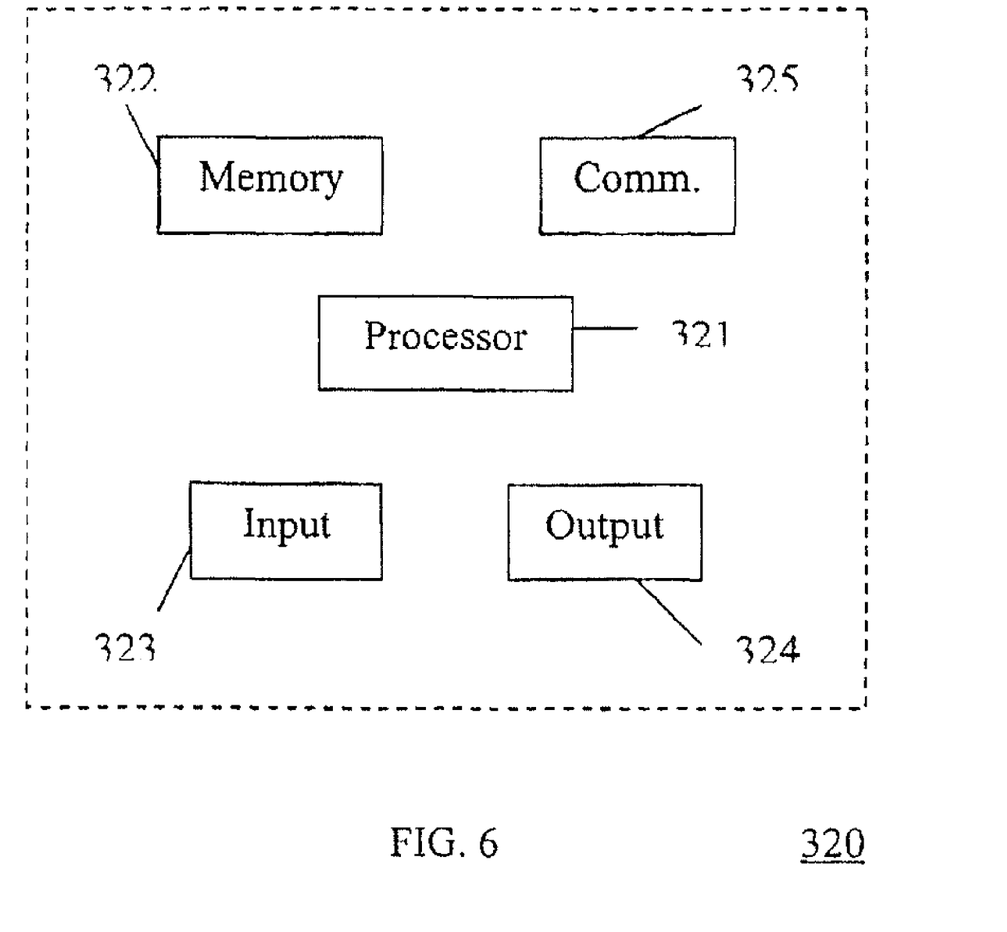
FIG. 6 illustrates components of an exemplary computing device utilized for monitoring location of participants in accordance with exemplary embodiments.

The determined location may be compared to coordinates of the conference facility 100 at 525. A list of coordinates corresponding to various areas of the conference facility may be stored within memory 322 of computing device 320 for example (FIG. 6). The coordinates may correspond to areas of conference facility 100 described above (such as entrances 110 and 120, registration area 130, rooms 140, booths 150, etc.). The match may be an exact match or within a predetermined threshold range. Based on this comparison, a participant's visit to a particular booth, such as booth 150, may be identified.

If signals from a plurality of participants indicate a similar or same location (in terms of coordinates) over a preset period of time (i.e. a number of seconds or minutes for example), then a determination may be made that these plurality of participants may have interacted with each other. The received signals may also be compared to the list of coordinates stored within memory 322 of computing device 320 to determine the location at which the plurality of participants interacted with each other.

In some embodiments, a plurality of participants 160 wearing badges 210 may move around the conference facility 100. CMS 170 may receive signals from each of these badges 210 and determines not only the location of each of the participants 160 (at a particular booth for example) at a particular time (i.e. the time at which the signal is received) but also a participant's location with respect to another participant.

Location information and time stamp may be stored at 530 as a record, such as the record 430, within computing device 320. A plurality of the records 430 may be stored within the computing device 230. Each record 430 may be identified by the anonymous identification code 222. In exemplary embodiments, the participant 160 may present his code 222 to CMS 170 and retrieve information pertaining to areas of the conference facility 100 that the participant visited at the conference. The participant data may be presented to the participant 160 at 535 (based on participant providing his or her anonymous code 222). In some embodiments, the data from the stored records 430 may be analyzed to evaluate success of the conference at 540 for example.

In some embodiments, the participant 160 may choose not to exchange his or her contact information with a vendor at one of the plurality of booths 150. The participant 160 may choose, after the conference, to provide the contact information to the vendor upon analyzing information received at the conference through verbal communications, print, and/or multimedia.

As illustrated in FIG. 6, computing device 320 at central monitoring station 170 may be a general purpose computing device. Computing device 320 can be a personal computer such as a desktop computer or a laptop computer or any other type of computing device having a processor 321, a memory 322, input means 323, output means 324 and communication means 325. It may be connected to a network via communication means such as a modem.

The information collected from the tracking modules 220 may be analyzed to evaluate several factors. Participant activity near or interest in particular vendors taking part in the conference (with booths 150 exhibiting offered products/services) may be measured. The activity/interest in the various vendors may be ranked according to the number of location signals received from each of the vendors. The popularity (based on received location signals) of a particular vendor may result either from location of the vendor booth 150 or from the products/services offered by the vendor. The value of a particular location within the conference facility 100 may be determined based on the volume of traffic through or at that location. Based on the determined value, the corresponding location may become more desirable for vendors.

The level of interest in a particular vendor during different days of the conference may also be ranked. The number of location signals received from a particular vendor location during each day of the conference may be accumulated (or counted) and compared between the various days. A ranking for each day may be determined based on comparing the number of location signals received for each of the different days. Similarly, ranking interest in a particular vendor during various times of the day (on an hourly basis for example) may also be determined.

In some embodiments, if multiple (i.e. at least two) participants 160 are determined to have interacted with each other, then the activity of each of the interacting participants may be analyzed further. A participant's activity after the interaction may be determined to have resulted from the interaction. As an example, if a first participant is determined to have visited a set of vendors prior to interacting with a second participant and the second participant then visits substantially the same set of vendors after the interaction, a determination may be made that the second participant's activity after the interaction resulted from or was influenced by the interaction.

Tracking modules 220 may also include a memory for storing locations visited by the participant 160 wearing the badge 210 including the tracking module. Vendor booths 150 may include transmitters for emitting location signals identifying the booth to the tracking module and the received location signal might be stored in the tracking module.

In some embodiments, tracking modules 220 may also receive information about products and services offered by vendors. This information may be received via information signals emitted by the transmitters at the vendor booths 150. Information received from the vendor booths 150 via the information signals may also be stored within the tracking modules 220. The stored product/service information may also be exchanged or transmitted to another tracking module. This may be desirable in settings where multiple participants from one organization (or unrelated to each other) may attend a conference or convention. One of the participants 160 may visit one part of the conference facility 100 and another participant may visit another part of the conference facility, and each of them may collect information in their respective tracking modules 220. At the end of each day or at the end of the convention, the participants may exchange or share information.

In some embodiments, the system as described herein is not limited to having one central monitoring station 170 for receiving location signals from tracking modules. A plurality of monitoring stations, either in place of the central monitoring station 170 or in addition to the central monitoring station, may be present within the conference or convention facility 100. The location of these stations may be distributed throughout the facility 100. Some of these monitoring stations may be located within vendor booths 150 for example. Each of these stations may receive the signals from the tracking modules 220 and forward them to the central monitoring station 170 either instantly or periodically at a predetermined frequency.

Exemplary methods described above are not restricted to application in a conference or trade show. In some embodiments, an individual's shopping interests may be determined by detecting the individual's presence at or near a particular store in a shopping mall for example.

Furthermore, the central monitoring station 170 described above may not be limited to one central location. In a conference setting for example, a plurality of vendors may have areas or booths 150 set up to demonstrate their products and services. A number of these booths 150 or areas may have non-central (or local) monitoring stations in addition to the central monitoring station 170. The local monitoring stations may achieve the same goal of tracking and analyzing participant activity. In some embodiments, each local monitoring station may periodically provide the stored information to the central monitoring station 170.

Exemplary embodiments can be within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

It is emphasized that the terms "comprises" and "comprising", when used in this application, specify the presence of stated features, integers, steps, or components and do not preclude the presence or addition of one or more other features, integers, steps, components, or groups thereof. In the following claims, the term identification unit may refer to badge 210.

Thus, this invention may be embodied in many different forms, not all of which are described above, and all such forms are contemplated to be within the scope of the invention. The particular embodiments described above are merely illustrative and should not be considered restrictive in any way. The scope of the invention is determined by the following claims, and all variations and equivalents that fall within the range of the claims are intended to be embraced therein.

What is claimed is:

1. A system comprising:
    a plurality of identification units, each of the plurality of identification units being associated with a different one of a plurality of participants and configured to be carried by the plurality of participants at a conference; and
    a monitoring station that is configured to receive signals from the plurality of identification units, to determine locations of each of the plurality of participants based on the signals from the plurality of identification units and associate a timestamp with the locations of each of the plurality of participants to provide associated timestamps for the locations of each of the plurality of participants, to store the locations of each of the plurality of participants and the associated timestamps, and to analyze the locations of each of the plurality of participants to determine an activity of the plurality of participants, wherein the monitoring station is further configured to:
    determine that at least two of the plurality of participants have interacted with one another in response to identifying that locations associated with the least two participants were in close proximity to one another and have associated timestamps that overlap for at least a predetermined amount of time; and
    receive a request from at least one of the at least two of the plurality of participants that have interacted with one another to provide information about at least one of remaining ones of the at least two of the plurality of participants that have interacted with one another.

2. The system of claim 1, wherein the monitoring station is further configured to determine when identification units carried by two of the participants are in close proximity to one another and have associated timestamps that overlap for at least the predetermined amount of time.

3. The system of claim 1, wherein:
    the tracking module is further configured to transmit the identification of signals to the monitoring station using radio frequency signals.

4. The system of claim 1, wherein:
    the tracking module includes a radio frequency identification module configured to transmit the identification of signals to the monitoring station using radio frequency signaling.

5. The system of claim 1, wherein:
    the tracking module is configured to respond to a request signal from the monitoring station by transmitting the identification of signals to the monitoring station.

6. The system of claim 1, wherein:
    the tracking module comprises a memory for storing information received from at least one external transmitter device, and the tracking module is further configured to relay the information received from at least one external transmitted device to the monitoring station.

7. The system of claim 6, wherein:
    the tracking module is configured to receive the information from an external transmitter device that resides at a vendor booth at a conference.

8. The system of claim 6, wherein:
    a tracking module in a first one of the plurality of identification units is configured to transmit the information to a tracking module of a second one of the plurality of identification units for storage in the tracking module of the second one of the plurality of identification units and for subsequent relay from the second one of the plurality of identification units to the monitoring station.

9. The system of claim 6, wherein:
    a tracking module in a first one of the plurality of identification units is configured to receive information from a tracking module of a second one of the plurality of identification units which was received by the second one of the plurality of identification units from at least one other external transmitter device, and is configured to store the information in the memory and to relay the information to the monitoring station.

10. The system of claim 1, wherein:
    the monitoring station is further configured to determine a number of signals that are received from an external transmitter device at a particular location over a plurality of predetermined time periods, and to rank the signals by volume over the plurality of predetermined time periods.

11. The system of claim 1, wherein:
    the predetermined amount of time corresponds to a defined number of hours.

12. A monitoring station comprising a computing device, the computing device comprising:
    an input means that is configured to receive signals from a plurality of identification units, each of the plurality of identification units being associated with different participants and configured to be carried by a plurality of participants at a conference;

a processor configured to determine locations of each of the different participants based on the signals from the plurality of identification units that are received and associate a timestamp with the locations of each of the different participants that are determined to provide associated timestamps for each of the different participants; and a memory configured to store the locations of each of the different participants that are determined and the associated timestamps for each of the different participants, wherein the processor is further configured to:

analyze the locations of each of the different participants to determine an activity of each of the different participants and to determine that at least two of the different participants have interacted with one another in response to identifying that the locations of identification units associated with the least two different participants were in close proximity to one another and had associated timestamps that overlap for at least a predetermined amount of time; and receive a request from at least one of the at least two of the plurality of participants that have interacted with one another to provide information about at least one of remaining ones of the at least two of the plurality of participants that have interacted with one another.

13. The monitoring station of claim 12, wherein:
the processor is further configured to determine a number of signals that are received from an external transmitter device at a particular location over a plurality of predetermined time periods, and to rank the signals by volume over the plurality of predetermined time periods.

14. The monitoring station of claim 13, wherein:
the plurality of predetermined time periods corresponds to a defined number of hours.

15. The system of claim 1, wherein each of the plurality of identification units includes a tracking module, the tracking module being configured to transmit to the monitoring station an identification of signals that the identification unit has received from external transmitter devices.

16. The system of claim 1, wherein the monitoring station is further configured to provide the information about at least one of remaining ones of the at least two of the plurality of participants that have interacted with one another responsive to the request.

17. The monitoring station of claim 12, wherein each of the plurality of identification units includes a tracking module, the tracking module being configured to transmit to the monitoring station an identification of signals that the identification unit has received from external transmitter devices.

18. The monitoring station of claim 12, wherein the processor is further configured to provide the information about at least one of remaining ones of the at least two of the plurality of participants that have interacted with one another responsive to the request.

* * * * *

UNITED STATES PATENT AND TRADEMARK OFFICE
CERTIFICATE OF CORRECTION

| | |
|---|---|
| PATENT NO. | : 8,228,203 B2 |
| APPLICATION NO. | : 12/621168 |
| DATED | : July 24, 2012 |
| INVENTOR(S) | : Craine |

Page 1 of 1

It is certified that error appears in the above-identified patent and that said Letters Patent is hereby corrected as shown below:

In the Claims:
Column 7, Claim 1, Line 60: Please correct "timestamps"
                             to read: -- timestamp --

Column 8, Claim 3, Line 14: Please correct "The system of claim 1"
                             to read -- The system of claim 15 --
        Claim 4, Line 18: Please correct "The system of claim 1"
                             to read: -- The system of claim 15 --
        Claim 5, Line 23: Please correct "The system of claim 1"
                             to read: -- The system of claim 15 --
        Claim 6, Line 27: Please correct "The system of claim 1"
                             to read: -- The system of claim 15 --

Signed and Sealed this
Twenty-fifth Day of September, 2012

David J. Kappos
*Director of the United States Patent and Trademark Office*